United States Patent
Kreuter

(10) Patent No.: US 10,087,817 B2
(45) Date of Patent: Oct. 2, 2018

(54) RECIPROCATING PISTON INTERNAL COMBUSTION ENGINE HAVING AN ANCILLARY CHAMBER CONTAINING A PISTON, AND METHOD FOR OPERATING THE SAME

(71) Applicant: Peter Kreuter, Aachen (DE)

(72) Inventor: Peter Kreuter, Aachen (DE)

(*) Notice: Subject to any disclaimer, the term of this patent is extended or adjusted under 35 U.S.C. 154(b) by 90 days.

(21) Appl. No.: 15/111,962

(22) PCT Filed: Jan. 20, 2015

(86) PCT No.: PCT/EP2015/000095
§ 371 (c)(1),
(2) Date: Jul. 15, 2016

(87) PCT Pub. No.: WO2015/110257
PCT Pub. Date: Jul. 30, 2015

(65) Prior Publication Data
US 2016/0333770 A1   Nov. 17, 2016

(30) Foreign Application Priority Data
Jan. 21, 2014  (DE) .................. 10 2014 000 750

(51) Int. Cl.
*F02B 19/02* (2006.01)
*F02B 19/06* (2006.01)
(Continued)

(52) U.S. Cl.
CPC .............. *F02B 19/02* (2013.01); *F02B 19/06* (2013.01); *F02B 19/108* (2013.01);
(Continued)

(58) Field of Classification Search
CPC ............ F02B 19/00–19/18; F02B 9/08; F02D 13/0276; F02M 26/17; F02M 26/40; F02M 26/41
(Continued)

(56) References Cited

U.S. PATENT DOCUMENTS 3,580,231 A * 5/1971 Bradbury ............... F02B 19/02
123/143 A
4,170,202 A * 10/1979 Perkins .................. F02B 19/02
123/143 A
(Continued)

FOREIGN PATENT DOCUMENTS

| CN | 101289964 A | 10/2008 |
| CN | 101583782 A | 11/2009 |

(Continued)

OTHER PUBLICATIONS

English translation of International Search Report dated Jul. 29, 2015 for parent application No. PCT/EP2015/000095.
(Continued)

*Primary Examiner* — Lindsay Low
*Assistant Examiner* — Robert Werner
(74) *Attorney, Agent, or Firm* — J-Tek Law PLLC; Jeffrey D. Tekanic; Scott T. Wakeman

(57) ABSTRACT

An internal combustion engine includes a piston reciprocally moving in at least one cylinder. An intake valve controls the supply of fresh air into a power chamber defined within the cylinder by the moving piston. An ancillary chamber is fluidly connected with the power chamber via a flow-through valve. An auxiliary piston is reciprocally movable in the ancillary chamber and determines the volume of the ancillary chamber. A fuel supply valve introduces fuel into the ancillary chamber. The flow-through valve, the fuel supply valve and the auxiliary piston are moved such that no
(Continued)

fresh air from the power chamber goes into the ancillary chamber and such that fuel is expelled from the ancillary chamber into the power chamber via the flow-through valve for combustion with fresh air compressed in the power chamber.

19 Claims, 4 Drawing Sheets

(51) Int. Cl.
    *F02M 21/02*     (2006.01)
    *F02B 19/10*     (2006.01)
    *F02D 13/02*     (2006.01)
    *F02F 3/28*     (2006.01)

(52) U.S. Cl.
    CPC ............ *F02D 13/0276* (2013.01); *F02F 3/28* (2013.01); *F02M 21/0287* (2013.01); *Y02T 10/125* (2013.01); *Y02T 10/18* (2013.01); *Y02T 10/32* (2013.01)

(58) Field of Classification Search
    USPC ............ 123/250–252, 258, 48 D, 58.7, 58.8, 123/568.13; 60/315
    See application file for complete search history.

(56) References Cited

U.S. PATENT DOCUMENTS

| | | | | |
|---|---|---|---|---|
| 4,210,105 A | * | 7/1980 | Nohira | F02B 3/02 123/250 |
| 4,342,300 A | * | 8/1982 | Matthes | F02B 19/02 123/250 |
| 4,424,780 A | * | 1/1984 | Trucco | F02B 19/02 123/255 |
| 5,285,756 A | | 2/1994 | Squires | |
| 5,826,558 A | * | 10/1998 | Kawamura | F02B 19/02 123/292 |
| 5,950,593 A | * | 9/1999 | Matsuoka | F02B 19/02 123/292 |
| 7,055,470 B2 | | 6/2006 | Kreuter et al. | |
| 7,950,357 B2 | | 5/2011 | Kreuter | |
| 8,910,612 B2 | * | 12/2014 | Woo | F02B 19/06 123/267 |
| 2004/0149254 A1 | * | 8/2004 | Piock | F02B 19/02 123/295 |
| 2008/0257304 A1 | | 10/2008 | Noda et al. | |

FOREIGN PATENT DOCUMENTS

| | | |
|---|---|---|
| DE | 355898 | 7/1922 |
| DE | 4334533 A1 | 4/1995 |
| GB | 2261028 A | 5/1993 |
| JP | H10141060 A | 5/1998 |
| WO | 9500752 A1 | 1/1995 |
| WO | 2008/081083 A1 | 7/2008 |

OTHER PUBLICATIONS

English translation of International Preliminary Report on Patentability for parent application No. PCT/EP2015/000095.

Search Report dated Jun. 12, 2018 from counterpart Chinese application No. 2015-80005230, and machine translation of substantive portions thereof.

Office Action from the Chinese Patent Office dated Jul. 3, 2018 in counterpart Chinese application No. 2015-80005230, and machine translation of substantive portions thereof.

* cited by examiner

RECIPROCATING PISTON INTERNAL COMBUSTION ENGINE HAVING AN ANCILLARY CHAMBER CONTAINING A PISTON, AND METHOD FOR OPERATING THE SAME

CROSS-REFERENCE

This application is the U.S. National Stage of International Application No. PCT/EP2015/000095 filed on Jan. 20, 2015, which claims priority to German patent application no. 10 2014 000 750.2 filed on Jan. 21, 2014.

TECHNICAL FIELD

The invention generally relates to a reciprocating piston internal combustion engine and to methods for operating a reciprocating piston internal combustion engine.

RELATED ART

To satisfy the strict exhaust gas regulations, in particular for diesel engines, an ever-increasing effort must be undertaken with regard to the fuel processing (very high injection pressures) as well as with regard to the exhaust gas post-treatment (nitrogen oxide catalyzers, urea injection, particle filters), whereby the manufacturing cost of such engines substantially increases. In addition, in modern 4-stroke engines with direct injection, fine particles form in the exhaust gas and the fine particles must be removed from the exhaust gas before discharging into the atmosphere.

In JP H10-141060 A, a reciprocating piston internal combustion engine is disclosed that has a power chamber is connected with an ancillary chamber via a flow-through valve. Before the piston reaches its top dead center (TDC) at the end of a compression stroke, the flow-through valve is opened so that compressed fresh air flows from the power chamber into the ancillary chamber. Fuel gas is mixed with the compressed fresh air in the ancillary chamber. Owing to the high compression, a self-ignition takes place so that a flame leaks out from the ancillary chamber into the power chamber and, during the combustion or power stroke, a complete combustion of the mixture composed of fuel gas and fresh air takes place. The volume of the ancillary chamber can be adapted to the load of the internal combustion engine.

SUMMARY

In one aspect of the present teachings, a reciprocating piston internal combustion engine as well as methods for operating a reciprocating piston internal combustion engine are disclosed that make it easier to satisfy strict exhaust gas regulations while also achieving a lower fuel consumption.

In another aspect of the present teachings, an internal combustion engine preferably includes at least one cylinder, in which a piston is reciprocally movable to define a power chamber in the cylinder. An ancillary chamber is fluidly connected with the power chamber via a flow-through valve. An auxiliary piston is reciprocally movable in the ancillary chamber to define the volume of the ancillary chamber. A fuel supply valve leads into the ancillary chamber. The flow-through valve, the fuel supply valve and the auxiliary piston are respectively moved such that no fresh air from the power chamber goes into the ancillary chamber. Furthermore, liquid or gaseous fuel is introduced via the fuel supply valve into the ancillary chamber and is then expelled from the ancillary chamber into the power chamber to form a combustible fuel/air mixture in the power chamber.

In such an internal combustion engine, gaseous or vaporized liquid fuel located in the ancillary chamber does not ignite there owing to insufficient fresh air in the ancillary chamber, and is forcibly pressed out and/or injected into the power chamber by the auxiliary piston. As a result of mixing with the fresh air in the power chamber, the fuel combusts there in a low-pollution manner and with low wall heat losses.

Such an internal combustion engine can be operated with liquid fuel, whereby a high injection pressure is not required.

In addition or in the alternative, such an internal combustion engine can be operated with gaseous fuel, e.g., pressurized hydrogen or compressed natural gas ("CNG").

Such an internal combustion engine can be configured as a four-stroke engine or a two-stroke engine.

Furthermore, such an internal combustion engine can be operated with externally-ignited fuel or self-igniting fuel.

In another embodiment of the present teachings, a piston head cavity may be advantageously designed in the piston head.

In one method for operating such an internal combustion engine, it operates according to the four-stroke process with liquid fuel.

In another method for operating such an internal combustion engine, it operates according to the four-stroke process with gaseous fuel.

In another method for operating such an internal combustion engine, it operates according to the two-stroke process with liquid fuel.

In another method for operating such an internal combustion engine, it operates according to the two-stroke process with gaseous fuel.

The present teachings will now be explained in an exemplary manner in the following with the assistance of schematic drawings and with further details.

DETAILED DESCRIPTION OF THE INVENTION

Figure 1:
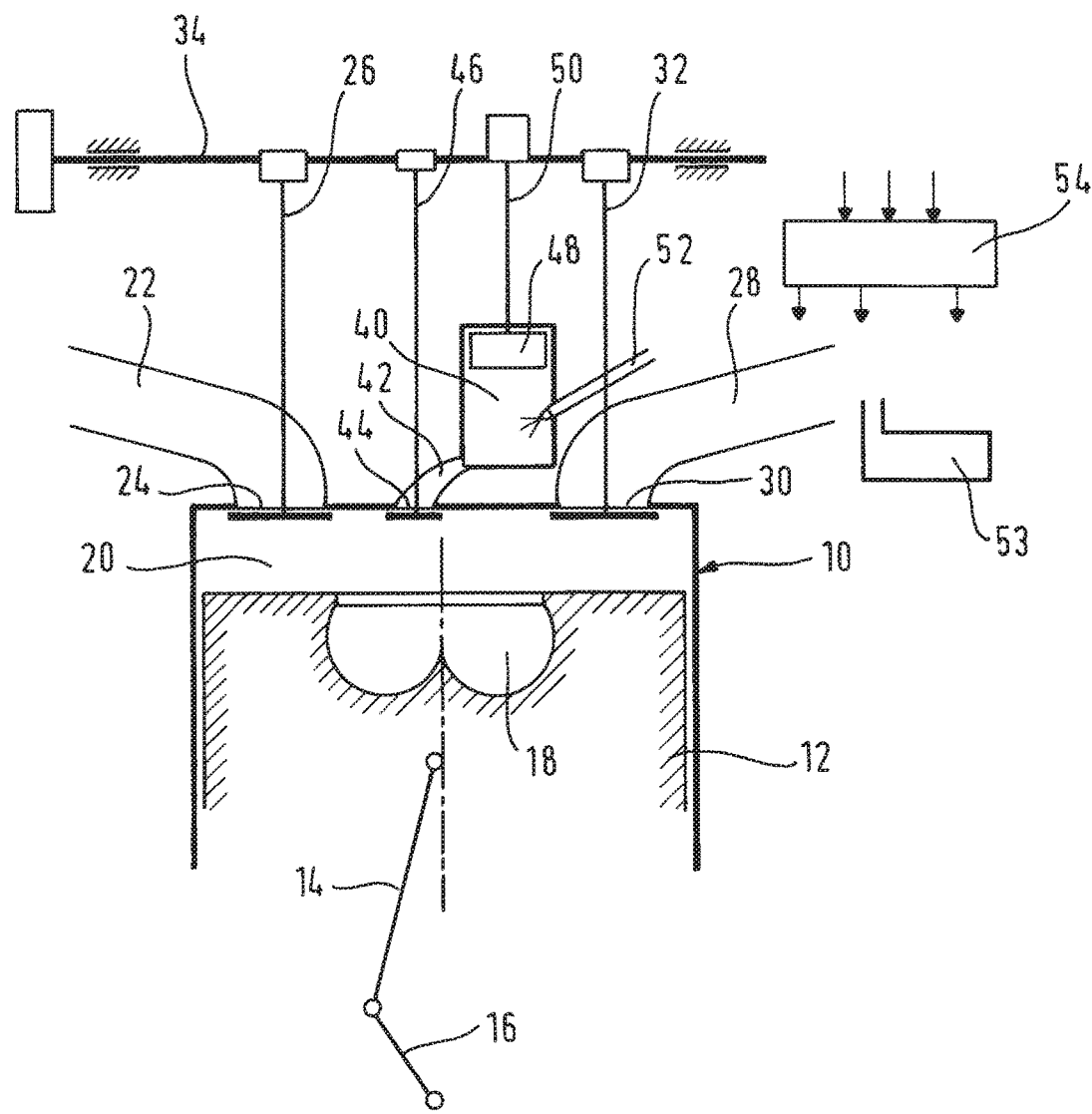
FIG. 1 shows a schematic cross-sectional view of an internal combustion engine according to one aspect of the present teachings.

According to FIG. 1, a representative internal combustion engine according to the present teachings includes at least one cylinder 10, in which a piston 12 is movable upwards and downwards. The piston 12 is connected with a crank of a crankshaft 16 via a piston rod 14. In the illustrated example, the piston 12 has a piston head cavity 18. The piston 12 defines the boundary of a power chamber 20 within the cylinder 10. An intake manifold 22 leads into the power chamber 20. An intake valve 26 is disposed in the opening of the intake manifold 22 into the power chamber 20 and/or in the intake opening 24. An exhaust manifold 28 leads out of the power chamber 20. An exhaust valve 32 is disposed in the outlet of the exhaust manifold 28 from the power chamber 20 and/or in the exhaust opening 30. The valves 26 and 32 are actuated by a camshaft 34 that is driven by the crankshaft 16 in a known manner.

The arrangement described up to now corresponds to a conventional engine and thus need not be further explained.

According to the present invention, an ancillary chamber 40 is formed, e.g., in the cylinder head. The ancillary chamber 40 is connected with the power chamber 20 via a connecting manifold 42. A flow-through valve 46 is disposed in the opening of the connecting manifold 42 into the power chamber 20 and/or in the connecting opening 44. In the ancillary chamber 40, an auxiliary piston 48, which determines the volume of the ancillary chamber 40, is upwardly and downwardly movable according to the Figure. The auxiliary piston 48 includes a shaft 50. The shaft 50 and thus the auxiliary piston 48 are actuatable by the camshaft 34 similar to the flow-through valve 46, and the camshaft 34 is thus an example of an apparatus configured to actuate the flow-through valve 46 and to move the auxiliary piston 50. The camshaft 34 is normally disposed parallel to the crankshaft 16. It extends perpendicular to the crankshaft 16 in FIGS. 1 and 3 merely to provide a simplified illustration.

Fuel is injectable into the ancillary chamber 40 in a meter-able amount by a fuel supply valve 52 formed, e.g., with an integrated injection nozzle. The fuel supply valve 52 is connected to a fuel supply unit 53, which has a known construction and is denoted as a whole with 53. In the present embodiment, the fuel supply unit 53 includes a fuel tank for liquid fuel, e.g., gasoline or diesel, that is connected to a fuel pump (not shown), which supplies pressurized fuel to the fuel supply valve 52. The operation of the fuel supply valve 52 is controlled by an electronic control unit (ECU) 54, which senses operating parameters of the internal combustion engine required therefor, such as the position of the gas pedal, the rotational position of the crankshaft, the rotational speed of the crankshaft, and controls the fuel supply valve 52 in accordance with a control program stored therein. The ECU 54 is thus an example of an apparatus configured to control the fuel supply valve 52.

Figure 2:
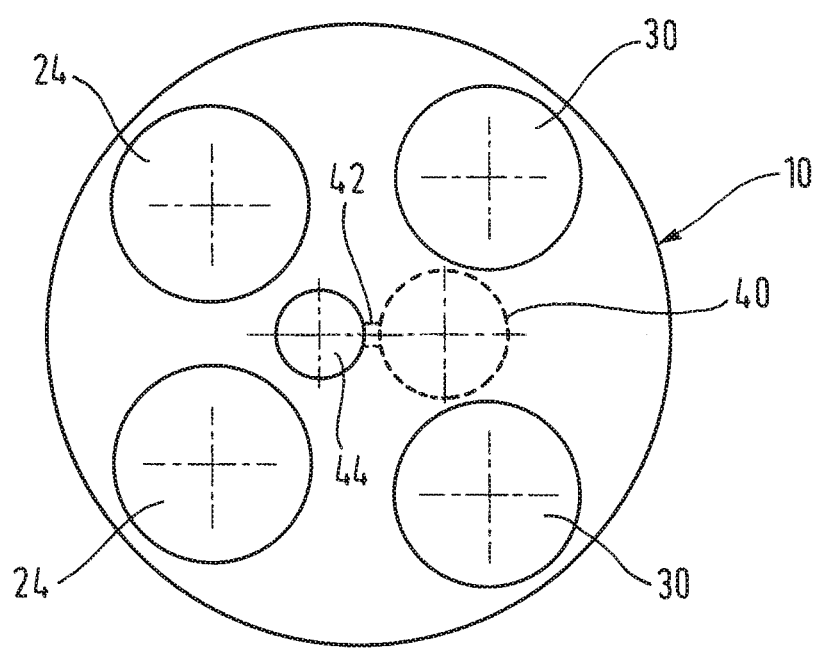
FIG. 2 shows a bottom view of a cylinder head of the internal combustion engine according to FIG. 1 that shows an example of the relative arrangement of the valves.

FIG. 2 shows, in a schematic bottom view, an example of the relative arrangement of intake opening 24, the exhaust opening 30 and connecting opening 44. In the illustrated example, two intake openings 24 are provided and two intake valves 26 respectively operate therein. Furthermore, two exhaust openings 30 are provided and two exhaust valves 32 respectively operate therein. The connecting opening 44, in which the flow-through valve 46 operates, is disposed centrally between the openings 24 and 30 and is connected with the ancillary chamber 40 via the short connecting manifold 42 that is formed with a small volume.

Figure 4:
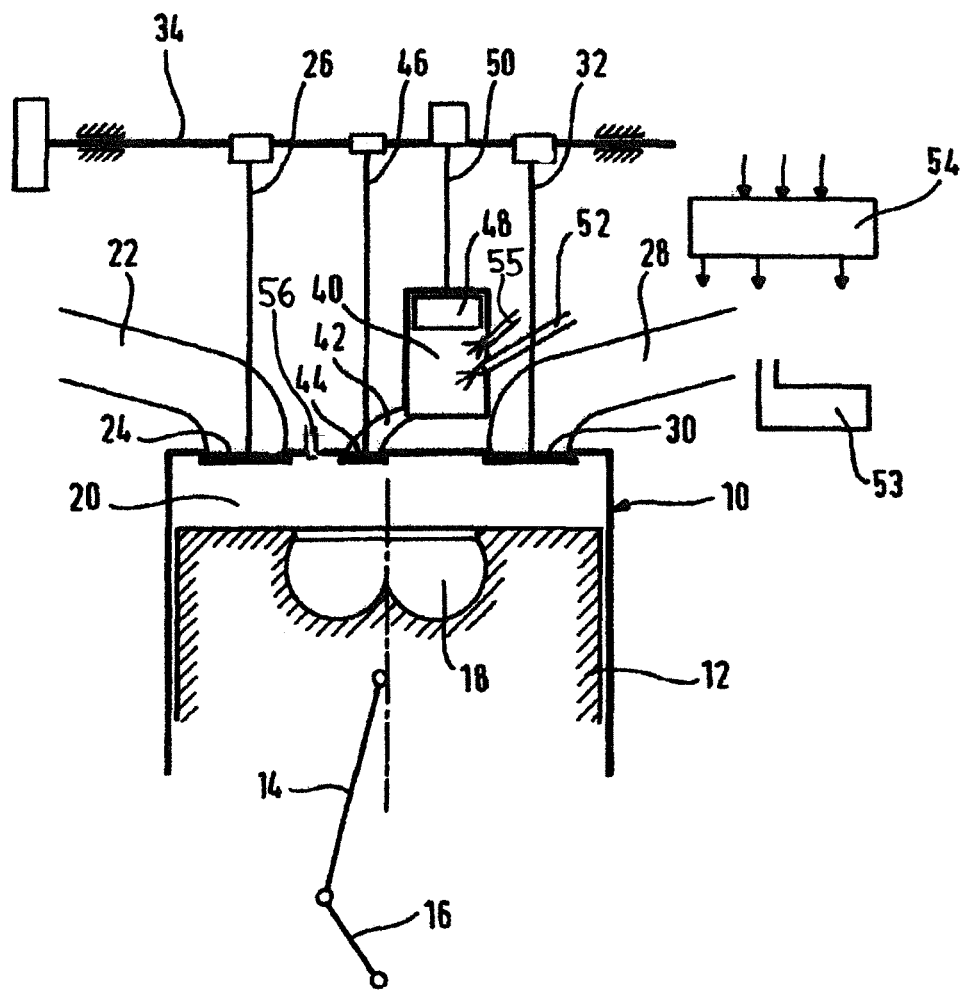
FIG. 4 shows a schematic cross-sectional view of an internal combustion engine according to another aspect of the present teachings.

The above-described arrangement may be operated as follows:

Four-stroke operation with liquid fuel:

When the piston 12 moves from its top dead center (TDC) to its bottom dead center (BDC), the intake valve 26 is open and fresh air is drawn in through the intake manifold 22. The piston 12 subsequently moves, with the intake valve 26 closed, from its BDC to its TDC to compress the fresh air located therein. Shortly before the piston 12 reaches its TDC, the flow-through valve 46 is opened and exhaust gas, which is located in the ancillary chamber 40 and to which fuel has been added by the fuel supply valve 52, is pushed-out and/or injected into the power chamber 20 and mixes there with the compressed fresh air. When the piston 12 reaches its TDC or shortly thereafter, the flow-through valve 46 is closed. When the engine is operated with diesel fuel, the compressed fresh charge located in the power chamber 20 ignites itself, and the piston 12 subsequently moves (is driven), while the fresh charge combusts, from its TDC to its BDC. The intake valve 26 and the exhaust valve 32 are closed during the power stroke. When the engine is operated with gasoline, the compressed fresh charge is ignited by an ignition means, e.g., a spark plug 56 (FIG. 4).

Before the piston 12 reaches its BDC, the flow-through valve 46 is opened and the auxiliary piston 48 begins its movement from its minimum position to its maximum position. The volume of the ancillary chamber 40 is maximal at the maximum position of the auxiliary piston 48. As a result, hot combusted exhaust gas flows out of the power chamber 20 and into the ancillary chamber 40. When the piston 12 is in the region of its BDC and/or before or at the opening of the exhaust valve 32, the flow-through valve 46 is closed, so that hot exhaust gas in the ancillary chamber 40 is at a pressure that corresponds, in essence, to the pressure prevailing in the power chamber 20 when the flow-through valve 46 is closed. The fuel supply valve 52 is opened, so that fuel is introduced, into the hot exhaust gas located in the ancillary chamber 40, in a pre-determined amount that corresponds to the load on the internal combustion engine. As a result, there is no danger of a detrimental combustion, because the exhaust gas located in the ancillary chamber 40 is free of oxygen, or contains oxygen as residual oxygen in an amount so small that, at most, a small combustion and/or oxidation reaction takes place (e.g., only 1 to 2% of the fuel amount present in the ancillary chamber combusts). This minimal combustion, if it takes place in the ancillary chamber 40, facilitates the mixture processing (mixture formation) both thermally and, owing to the resulting turbulence, mechanically. With the henceforth open exhaust valve 32, the piston 12 moves to its TDC, such that the exhaust gas generated from the load (charge) combusted in the power chamber 20 is pushed out through the exhaust manifold 28. A new intake stroke then begins.

The above-described method has the following advantages:

Upstream of the fuel supply valve 52, a pressure is required that is merely above the exhaust gas pressure prevailing in the ancillary chamber 40 when the flow-through valve 46 is closed. The liquid fuel is injected into the ancillary chamber 40 in a first phase by opening the fuel supply valve 52 with the flow-through valve 46 closed, and is vaporized and processed there in a first phase while being intensively mixed with the hot exhaust gas located in the ancillary chamber 40. This processing (mixture formation) is, if applicable, facilitated by a minimal combustion and/or oxidation reaction that takes place in the ancillary chamber 40. The ancillary chamber 40 thus functions as a mixture processing chamber. Subsequently, the fuel is additionally processed in a further (second) phase when it flows into the compressed fresh air in the power chamber 20 with the flow-through valve 46 open. A further (third) processing phase follows the flowing-in (second phase). During the third phase, the fuel-exhaust gas mixture mixes with the fresh air located in the power chamber 20. The mixture formation thus takes place in three phases.

In this way, an excellent processing of even hard-to-vaporize fuels is achieved without the necessity of a high injection pressure, and which results in a substantially homogeneous and complete combustion of the fuel. This ensures a high efficiency of the internal combustion engine and also reduces the demands on the eventual exhaust gas post-treatment.

Internal combustion engines according to the present teachings can have one or more cylinders and can be operated with self-ignition or external-ignition according to the fuel that is utilized. Thus, operation with liquid and/or gaseous fuel is possible.

The volume of the connecting manifold 42 is preferably as small as possible relative to the volume of the ancillary chamber 40, so that the mixture of fuel and exhaust gas is pushed out and/or injected into the power chamber 20 as completely as possible by the movement of the auxiliary piston 48 to its minimum position.

The actuation of the valves as well as the auxiliary piston by the camshaft 34 is indicated merely schematically. Between the cams of the camshaft and the valve shafts and/or the shaft 50, transmission members such as rocker arms, pivot levers, etc. can be disposed. The flow-through valve 46 is preferably held in a closed position by a not-shown spring, which reliably holds it closed when there is a negative pressure in the ancillary (mixture formation) chamber 40. Suitable camshafts may be provided for the valves and auxiliary piston that are driven by the crankshaft, if necessary, with the intervening arrangement of phase adjusters. The valves and the auxiliary piston can also be driven by their own drives, e.g., electronically, electromagnetically, hydraulically or pneumatically.

It is particularly advantageous to form the flow-through valve 46 as a valve that is freely controllable by the electronic control unit 54, in which one or more holes are exposed by moving a valve member that is controlled by the electronic control unit 54 and is actuated magnet-electrically, piezo-electrically or hydraulically. In case it is expedient, separate flow-through valves could be utilized to introduce exhaust gas into the ancillary chamber and to inject the fuel gas from the ancillary chamber. The amount of residual oxygen, which goes into the ancillary chamber 40 with the exhaust gas, can be influenced by controlling the flow-through valve 46.

The flow-through valve 46 and/or the connecting opening 44 is advantageously disposed as centrally as possible over the power chamber 20.

The maximum volume of the ancillary chamber 40 (i.e. when the auxiliary piston 48 is in the maximum position) amounts to, e.g., about 1% of the maximum volume of the power chamber 20 (piston 12 in BDC).

The flow-through valve 46 is opened for the charging of the mixture formation chamber 40 with exhaust gas, e.g., during a crankshaft rotation by about 45° and closes about simultaneously with the opening of the exhaust valve 32. The opening of the flow-through valve 46, the movement of the auxiliary piston 48 to increase the volume of the ancillary chamber 40, the movement of the piston 12 and the opening of the exhaust valve 32 are tuned to each other such that the (dynamic) pressure in the power chamber 20 for the charging of the ancillary chamber 40 is greater than the (dynamic) pressure in the ancillary chamber 40.

The fuel is advantageously introduced into the ancillary chamber 40 as early as possible so that more time is available for the first phase of the mixture formation.

For the injection of the exhaust gas-fuel mixture from the ancillary chamber 40 into the power chamber 20, the flow-through valve 46 is opened, e.g., during a rotation of the crankshaft by about 40°, and is closed at, or shortly after, the TDC of the piston 12.

In the preceding, the operation of the internal combustion engine with liquid fuel, such as gasoline, diesel, liquid gas, methanol, etc., was explained.

However, operation with gaseous fuel, such as natural gas, hydrogen, methane, etc., is also possible. In such an embodiment, the fuel supply unit 53 includes a pressure tank for holding a reservoir of the pressurized gaseous fuel and/or combustible gas. The fuel supply (metering) valve 52 is then designed as a valve having one or more accompanying exhaust openings and is suitable for the controlled introduction of pressurized gaseous fuel into the ancillary chamber 40. Because processing and/or vaporization of the liquid fuel and/or combustible gas in the ancillary chamber 40 with the assistance of the exhaust gas is not required, the internal combustion engine and/or its operation is advantageously modified in the following ways:

Four-stroke operation with gaseous fuel:

The flow-through valve 46 is, as was described in the preceding, closed immediately after the injection of gaseous fuel located in the ancillary chamber 40 into the power chamber 20 when the piston 12 is located in the range of its TDC, and then stays closed, in contrast to the above-described embodiment, until it is opened again to inject gaseous fuel into the power chamber 20. Immediately after the closing of the flow-through valve 46, the auxiliary piston 48 moves towards its maximum position to increase the volume of the ancillary chamber 40 and, advantageously when the auxiliary piston 48 is still located in the minimum position, the introduction of an amount of gaseous fuel through the fuel supply valve 52 begins in accordance with the load on the internal combustion engine. It is thus advantageous to tune the control of the fuel supply valve 52 to the movement of the auxiliary piston 48 such that the pressure in the ancillary chamber 40 while its volume is increasing corresponds to the supply pressure prevailing in the gas tank and prevailing upstream of the fuel supply valve 52. The fuel supply unit 53 can, e.g., include a gas tank, in which hydrogen having a pressure of 700 bar is stored. When the amount of gaseous fuel required for the load on the internal combustion engine is introduced into the ancillary chamber 40 and the fuel supply valve 52 is closed, the volume of the ancillary chamber 40 further increases, if applicable, until the auxiliary piston 48 has moved to its maximum position. The pressure in the ancillary chamber 40 decreases then. During movement of the auxiliary piston 48 back to its minimum position, the pressure in the ancillary chamber 40 increases until the flow-through valve 46 opens and the gaseous fuel is injected into the power chamber 20.

When a gaseous fuel is utilized, the fuel supply valve 52 is advantageously disposed such that the introduction of the fuel gas into the ancillary chamber 40 can begin already when the auxiliary piston 48 is located in its minimum position and then, if necessary, can continue during movement of the auxiliary piston 48 away from its minimum position.

In comparison to a conventional mixing of the gaseous fuel into the fresh air upstream of the intake valve 26 or a conventional direct injection of the gaseous fuel into the power chamber 20, the following advantages are achieved with the intermediate storing of the gaseous fuel in the ancillary chamber 40 and the injection of the gaseous fuel into the power chamber 20:

The gaseous fuel, which is at its supply pressure, is initially introduced into the ancillary chamber 40 while substantially maintaining its pressure, wherein a gas supply valve having a large opening cross-section is advantageously utilized. Subsequently, the gas located in the ancillary chamber 40 initially expands owing to the movement of the auxiliary piston 48. In the following movement of the auxiliary piston 48 from its maximum position to the minimum position, the pressure in the ancillary chamber 40 increases until the flow-through valve 46, advantageously controlled by the electronic control unit 54, opens upon reaching a positive pressure difference from the ancillary chamber 40 to the power chamber 20 and the gas located in the ancillary chamber 40 is injected into the power chamber 20.

The opening of the flow-through valve 46 takes place, in general, at a pressure in the ancillary chamber 40, which is less the supply pressure upstream of the fuel supply valve 52. In this way, at least a portion of the energy, which was required to compress the gaseous fuel to its storage pressure in the reservoir tank, can be used. The efficiency of the internal combustion engine is thereby improved.

In the preceding, the present teachings were explained with respect to an internal combustion engine, which is operated in the four-stroke process with liquid or gaseous fuel. Internal combustion engines according to the present teachings, in particular the ancillary chamber 40 having the flow-through valve 46 and the auxiliary piston 48, can also be utilized for operation in the two-stroke process:

Two-stroke operation with liquid fuel:

The control times of the intake valve(s) and exhaust valve are thus selected in a known manner such as is common for two-stroke engines, so that a good compromise of fresh gas filling, compression and scavenging is achieved. For example, the intake valve opens between 180 degrees and 300 degrees of the crankshaft and the exhaust valve opens between 160 degrees and 280 degrees of the crankshaft. Compressed fresh air is supplied to the internal combustion engine. The compression can be effected, e.g., in an exhaust gas turbocharger that is externally driven as long as sufficient energy-rich exhaust gas not available, or an externally-driven charger is used in addition thereto. The intake valve (s) 24 can be formed as illustrated in FIGS. 1 and 2 or can be formed by slits in the cylinder wall in a known manner, which slits are exposed by the piston 12 when it approaches its BDC. Furthermore, the exhaust valve(s) is (are) advantageously plate valve(s), wherein the connecting opening 44 having the flow-through valve 46 is disposed as near as possible to the exhaust opening(s) 30, so that exhaust gas going into the ancillary chamber 40 is at least substantially free of fresh air or fresh charge. For the rest, the function and mode of operation of the ancillary chamber 40 in two-stroke operation correspond to those in four-stroke operation.

In operation with liquid fuel, the following power steps take place:

During the movement of the piston 12 in a last phase before BDC up to a first phase after BDC, pressurized fresh air is introduced into the power chamber 20 with the intake valve 26 open and, in a temporally overlapping manner, exhaust gas is discharged from the power chamber 20 with the exhaust valve 32 open.

The flow-through valve 46 is opened to charge the ancillary chamber 40 with exhaust gas, e.g., about 90 degrees after TDC, and is closed at the latest before opening of the exhaust valve(s) 32. After closing the flow-through valve 46, liquid fuel is supplied to the exhaust gas located in the ancillary chamber 40 in a metered amount, which liquid fuel is vaporized in the ancillary chamber 40.

During movement of the piston 12 to the TDC, the intake valve 26 and the exhaust valve 32 are closed, wherein the introduced, compressed fresh air is further compressed.

Shortly before or when the piston 12 is located in its TDC (e.g., 20 degrees until 0 degrees before TDC), the flow-through valve 46 is opened so that the gaseous fuel/exhaust gas mixture located in the ancillary chamber 40 is forcibly injected into the power chamber 20 by movement of the auxiliary piston 48 from its maximum position to its minimum position, and is combusted there by self-ignition or external-ignition.

As compared to the four-stroke operation, in two-stroke operation, the duration available to vaporize the liquid fuel in the ancillary chamber 40 is, in fact, considerably shortened; nevertheless, the above-explained advantages remain substantially retained. A further advantage, which is achieved in two-stroke operation with the ancillary chamber, is that a leakage of vaporized fuel into the exhaust gas is at least substantially prevented.

Two-stroke operation with gaseous fuel:

In operation with gaseous fuel, the power steps explained in the preceding take place in a similar manner with the difference that the opening of the flow-through valve 46 is omitted for the purpose of the flowing-in of exhaust gas into the ancillary chamber 40 and the gaseous fuel is injected into the ancillary chamber 40 immediately after closing the flow-through valve 46 when the auxiliary piston 48 is still located in its minimum position or immediately after movement of the auxiliary piston 48 away from its minimum position, similar to the four-stroke process with gaseous fuel explained above.

In all implementations of the invention described above, it can be achieved that the vaporized or gaseous fuel does not reach the walls of the power chamber 20, whereby the combustion is improved and wall heat losses are decreased.

Internal combustion engines according to the present teachings can be operated with liquid as well as with gaseous fuel when two fuel supply (metering) valves and accompanying fuel supply units are provided, which are adapted to the respective types of fuel. That is, as shown in FIG. 4, fuel can also be injected into the ancillary chamber 40 by a second fuel supply valve 55. Thus, the first fuel supply valve 52 may be configured to introduce liquid fuel into the ancillary chamber, and the second fuel supply valve 55 may be configured to introduce gaseous fuel into the ancillary chamber 40. In operation with gaseous fuel, merely a software change in the electronic control unit 54 is required when changing, e.g., from hydrogen to CNG, to adapt to different storage pressures, heats of combustion, etc.

Figure 3:
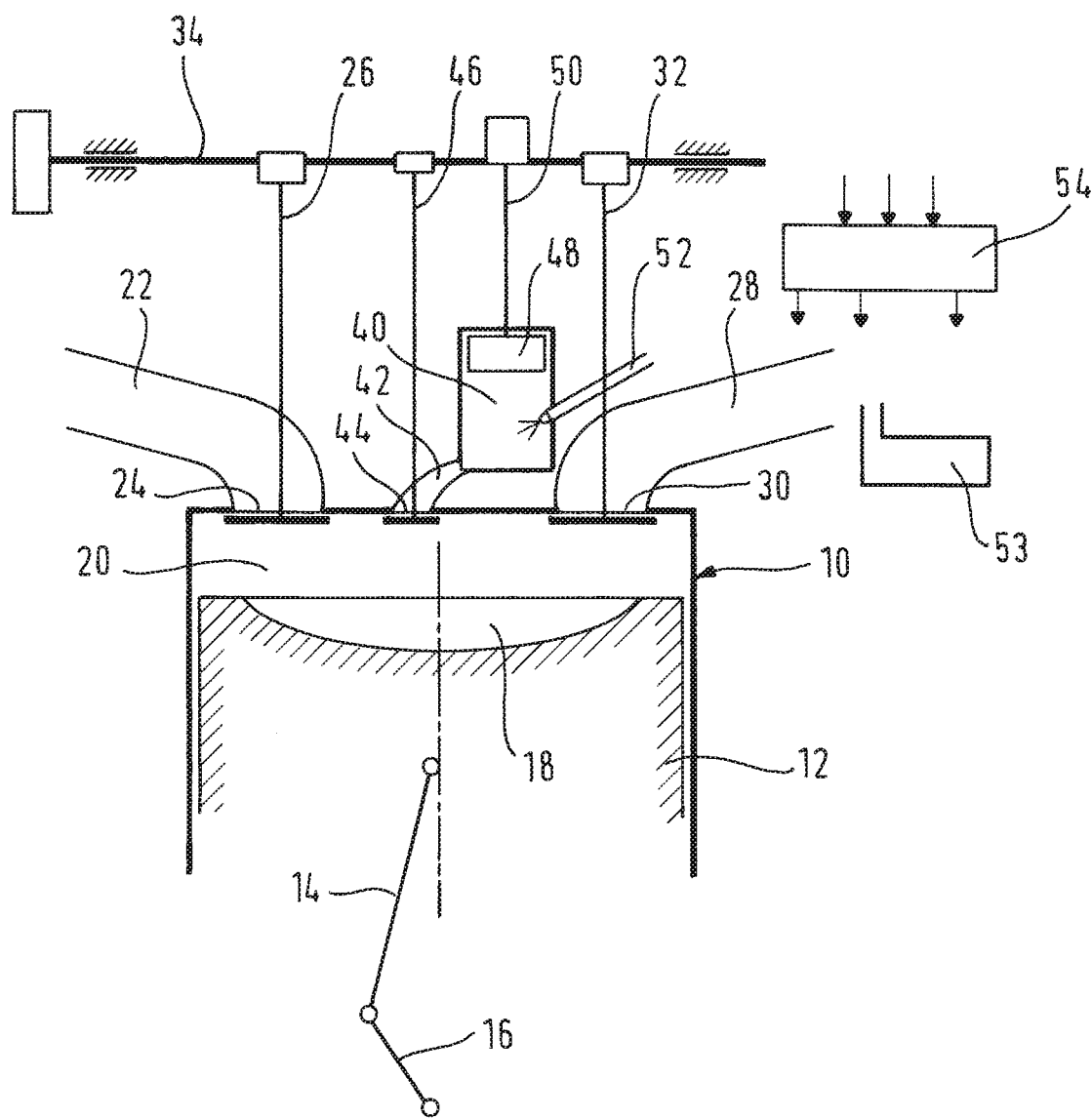
FIG. 3 shows a schematic cross-sectional view of an internal combustion engine according to the present teachings having a piston head that is modified as compared to the embodiment shown in FIG. 1.

With respect to the piston head cavity 18, larger design freedoms exist in internal combustion engine according to the present teachings than in conventional internal combustion engines, in which the cavity makes a decisive contribution to the mixture processing. Formation (design) of the piston head cavity 18 as a relatively flat, concave depression, which extends over a large portion of the piston head, as illustrated in FIG. 3 is advantageous. The depth of the depression amounts to, e.g., approximately 10 to 20% of the piston diameter. The depression extends, e.g., over more than 70% of the cross-sectional surface of the piston 12. With this design of the piston head cavity 18, it is avoided that a squished flow forms between the piston and the cylinder at the end of a compression stroke that would cause the heat exchange between the piston 12 and the cylinder to become large in a disadvantageous manner. Furthermore, when the expansion begins, the reverse flow speed of the combusting cylinder charge is decreased, whereby an improvement of the efficiency is achieved.

It is explicitly emphasized that all features disclosed in the description and/or in the claims are intended to be disclosed separately and independently from each other for the purpose of original disclosure as well as for the purpose of restricting the claimed invention. It is explicitly stated that all value indications are only exemplary and are not limiting.

REFERENCE NUMBER LIST

10 Cylinder
12 Piston
14 Piston rod
16 Crankshaft
18 Piston head cavity
20 Power chamber
22 Intake manifold
24 Intake opening
26 Exhaust valve
28 Exhaust manifold
30 Exhaust opening
32 Exhaust valve
34 Camshaft
40 Ancillary chamber
42 Connecting manifold
44 Connecting opening
46 Flow-through valve
48 Auxiliary piston
50 Shaft
52 Fuel supply valve
53 Fuel supply unit
54 Electronic control unit

The invention claimed is:

1. An internal combustion engine including:
at least one cylinder,
a piston connected with a crankshaft and reciprocally movable within the at least one cylinder to define a power chamber therein,
an intake valve configured to control a supply of fresh air into the power chamber,
an exhaust valve configured to control a discharge of exhaust gas from the power chamber, wherein the internal combustion engine is configured such that a combustible fuel/air mixture located in the power chamber combusts during each of a plurality of power strokes and drives the piston in a direction of movement from a top dead center (TDC) to a bottom dead center (BDC) to rotationally drive the crankshaft,
an ancillary chamber connected with the power chamber via a flow-through valve,
an auxiliary piston reciprocally movable within the ancillary chamber,
at least one fuel supply valve configured to supply liquid fuel or gaseous fuel into the ancillary chamber,
an apparatus configured to actuate the flow-through valve and the fuel supply valve and to move the auxiliary piston such that:
during engine operation and after a first power stroke of the plurality of power strokes no fresh air from the power chamber goes into the ancillary chamber, and
by moving the auxiliary piston, uncombusted liquid fuel, after vaporization in the ancillary chamber, or uncombusted gaseous fuel is expelled from the ancillary chamber and injected into the power chamber to form the combustible fuel/air mixture in the power chamber.

2. The internal combustion engine according to claim 1, wherein the at least one fuel supply valve is configured to introduce liquid fuel into the ancillary chamber and is connected to a fuel supply unit that supplies pressurized liquid fuel.

3. The internal combustion engine according to claim 1, wherein the at least one fuel supply valve is configured to introduce gaseous fuel into the ancillary chamber and is connected to a fuel supply unit that supplies pressurized gaseous fuel.

4. The internal combustion engine according to claim 1, wherein the at least one fuel supply valve includes a first fuel supply valve configured to introduce liquid fuel into the ancillary chamber and a second fuel supply valve configured to introduce gaseous fuel into the ancillary chamber.

5. The internal combustion engine according to claim 1, configured as a four-stroke engine.

6. The internal combustion engine according to claim 1, configured as a two-stroke engine.

7. The internal combustion engine according to claim 1, wherein the combustible fuel is diesel fuel, and the piston and the apparatus are configured to compress the combustible fuel/air mixture located in the power chamber at the beginning of each of the power strokes such that the diesel fuel self ignites.

8. The internal combustion engine according to claim 1, further including an ignition means for igniting the fuel/air mixture located in the power chamber at the beginning of each of the power strokes.

9. The internal combustion engine according to claim 1, wherein the piston has a piston head cavity that is formed as a shallow, concave depression that extends at least over a large portion of the piston head.

10. A method for operating an internal combustion engine that includes at least one cylinder, in which a piston connected with a crankshaft and defining a power chamber is reciprocally movable, wherein fresh air flows into the power chamber in an intake stroke, said fresh air is compressed in a compression stroke, the compressed fresh air mixed with fuel is combusted in a power stroke, and hot exhaust gas discharges from the power chamber in an exhaust stroke, the method further comprising:
flowing a portion of the hot exhaust gas generated by the combustion from the power chamber into an ancillary chamber by opening a flow-through valve located in a fluid communication path between the power chamber and an ancillary chamber and moving an auxiliary piston within the ancillary chamber to increase a volume of the ancillary chamber,
introducing fuel into the hot exhaust gas located in the ancillary chamber and allowing the fuel to vaporize in the ancillary chamber, due to thermal energy of the exhaust gas, and to mix with the exhaust gas, and
injecting the exhaust gas and uncombusted vaporized fuel located in the ancillary chamber into the power chamber as a gaseous fuel/exhaust gas mixture during an end portion of the compression stroke and/or during an initial portion of the power stroke by opening the flow-through valve and moving the auxiliary piston to decrease the volume of the ancillary chamber.

11. The method according to claim 10, wherein the hot exhaust gas that flows from the power chamber into the ancillary chamber contains residual oxygen so that the vaporization of the fuel introduced into the ancillary chamber is facilitated by combustion energy released owing to combustion of a portion of the fuel located in the ancillary chamber.

12. A method for operating an internal combustion engine that includes at least one cylinder, in which a piston connected with a crankshaft and defining a power chamber is reciprocally movable, wherein fresh air flows into the power chamber in an intake stroke, said fresh air is compressed in a compression stroke, the compressed fresh air mixed with fuel is combusted in a power stroke, and exhaust gas discharges from the power chamber in an exhaust stroke, the method further comprising:

introducing uncombusted gaseous fuel into an ancillary chamber and injecting the uncombusted gaseous fuel located in the ancillary chamber into the power chamber during an end portion of the compression stroke and/or during an initial portion of the power stroke by opening a flow-through valve located in a fluid communication path between the power chamber and the ancillary chamber and moving an auxiliary piston within the ancillary chamber to decrease the volume of the ancillary chamber.

13. A method for operating an internal combustion engine that includes at least one cylinder, in which a piston connected with a crankshaft and defining a power chamber is reciprocally movable between a bottom dead center (BDC) and a top dead center (TDC), the method including:

during movement of the piston in a last phase before the BDC up to a first phase after BDC, introducing pressurized fresh air into the power chamber and discharging hot exhaust gas from the power chamber, wherein a portion of said hot exhaust gas is supplied into an ancillary chamber by opening a flow-through valve located in a fluid communication path between the power chamber and the ancillary chamber and moving an auxiliary piston within the ancillary chamber to increase a volume of the ancillary chamber, during movement of the piston from the first phase after BDC to the TDC, compressing the fresh air located in the power chamber, introducing liquid fuel into the hot exhaust gas located in the ancillary chamber and allowing the fuel to vaporize in the ancillary chamber owing to thermal energy of the hot exhaust gas, injecting an uncombusted quantity of said vaporized fuel mixed with hot exhaust gas into the compressed fresh air located in the power chamber during an end portion of a compression stroke and/or during an initial portion of a power stroke by opening the flow-through valve and moving the auxiliary piston to decrease the volume of the ancillary chamber, and during a first phase of movement of the piston from the TDC to the BDC, combusting the fuel/air mixture in the power chamber.

14. The method according to claim 13, wherein the hot exhaust gas supplied into the ancillary chamber contains residual oxygen so that the vaporization of the fuel introduced into the ancillary chamber is facilitated by combustion energy released owing to combustion of a portion of the fuel located in the ancillary chamber.

15. A method for operating an internal combustion engine that includes at least one cylinder, in which a piston connected with a crankshaft and defining a power chamber is reciprocally movable between a bottom dead center (BDC) and a top dead center (TDC), the method including:

during movement of the piston in a last phase before the BDC up to a first phase after BDC, introducing pressurized fresh air into the power chamber and discharging exhaust gas from the power chamber, during movement of the piston from the first phase after BDC to the TDC, compressing the fresh air that was introduced into the power chamber, introducing pressurized gaseous fuel into an ancillary chamber, opening a flow-through valve located in a fluid communication path between the power chamber and the ancillary chamber during an end portion of a compression stroke and/or during an initial portion of a power stroke and moving an auxiliary piston within the ancillary chamber to expel an uncombusted quantity of said gaseous fuel from the ancillary chamber and to inject said uncombusted quantity of said gaseous fuel into the compressed fresh air located in the power chamber, and during a first phase of movement of the piston from the TDC to the BDC, combusting the fuel/air mixture in the power chamber.

16. The method according to claim 12, further comprising:

after the gaseous fuel from the ancillary chamber has been injected into the power chamber, moving the auxiliary piston from a minimum value to a maximum value to increase the volume of the ancillary chamber, wherein:

the gaseous fuel, which is at a supply pressure, is introduced into the ancillary chamber during a first phase of the volume increase of the ancillary chamber, such that the pressure prevailing in the ancillary chamber substantially corresponds to the supply pressure, after the introduction of the gaseous fuel into the ancillary chamber has ended, the volume of the ancillary chamber is further increased to the maximum value such that the gaseous fuel located therein expands, and subsequently the volume of the ancillary chamber is decreased by moving the auxiliary piston to the minimum value to inject the gaseous fuel into the power chamber.

17. The internal combustion engine according to claim 1, wherein the apparatus comprises:

a camshaft configured to actuate the flow-through valve and the auxiliary piston, and an electronic control unit configured to control the fuel supply valve.

18. The internal combustion engine according to claim 17, wherein the camshaft and the electronic control unit are configured such that liquid or gaseous fuel is introduced into the ancillary chamber while the flow-through valve is closed and the auxiliary piston is moving from a first position, in which a volume of the ancillary chamber is a minimum, to a second position, in which the volume of the ancillary chamber is a maximum.

19. The internal combustion engine according to claim 9, wherein the concave depression extends over at least 70% of a cross-sectional surface area of the piston head and has a depth that is 10-20% of a diameter of the piston head.

* * * * *